United States Patent
Zuchoski et al.

(10) Patent No.: US 8,347,991 B2
(45) Date of Patent: Jan. 8, 2013

(54) TRACK ASSEMBLY FOR AN ALL-TERRAIN VEHICLE

(75) Inventors: Jérémie Zuchoski, St-Leonard-d'Aston (CA); Denis Boisvert, St-Gerard-des-Laurentides (CA)

(73) Assignee: Camoplast Solideal, Inc., Quebec (CA)

( * ) Notice: Subject to any disclaimer, the term of this patent is extended or adjusted under 35 U.S.C. 154(b) by 292 days.

(21) Appl. No.: 12/684,698

(22) Filed: Jan. 8, 2010

(65) Prior Publication Data
US 2010/0108421 A1 May 6, 2010

Related U.S. Application Data

(63) Continuation of application No. 12/028,177, filed on Feb. 8, 2008, now abandoned.

(30) Foreign Application Priority Data

Oct. 3, 2007 (CA) .................................... 2606039

(51) Int. Cl.
*B62D 55/00* (2006.01)
(52) U.S. Cl. ........................ 180/9.25; 180/9.1
(58) Field of Classification Search ................ 180/9.25, 180/9.3, 9.28, 184, 190, 193; 305/168, 181, 305/185, 188, 127
See application file for complete search history.

(56) References Cited

U.S. PATENT DOCUMENTS

| 1,368,652 | A |   | 2/1921 | Pennington et al. |
| 1,539,582 | A |   | 5/1925 | Landry |
| 3,545,559 | A |   | 12/1970 | Jones |
| 3,598,454 | A |   | 8/1971 | Richards |
| 3,664,449 | A | * | 5/1972 | Vardell ........................ 180/9.48 |
| 3,688,858 | A |   | 9/1972 | Jespersen |
| 3,771,616 | A |   | 11/1973 | Parodi |
| 3,776,325 | A |   | 12/1973 | Jespersen |
| 3,841,424 | A |   | 10/1974 | Purcell et al. |
| 3,937,288 | A |   | 2/1976 | Kehler |
| 3,938,606 | A |   | 2/1976 | Yancey |
| 4,232,753 | A |   | 11/1980 | Carlson |
| RE32,442 | E |   | 6/1987 | Satzler |
| 4,681,177 | A |   | 7/1987 | Zborowski |
| 4,699,229 | A |   | 10/1987 | Hirose et al. |
| 4,714,125 | A |   | 12/1987 | Stacy |
| 4,881,609 | A |   | 11/1989 | Purcell et al. |
| 4,953,919 | A |   | 9/1990 | Langford |
| 5,273,126 | A | * | 12/1993 | Reed et al. .................. 180/9.21 |
| 5,340,205 | A |   | 8/1994 | Nagorcka |
| 5,533,587 | A |   | 7/1996 | Dow et al. |
| 5,842,757 | A |   | 12/1998 | Kelderman |
| D408,326 | S | * | 4/1999 | Dandurand .................... D12/7 |
| RE36,284 | E |   | 8/1999 | Kelderman |

(Continued)

FOREIGN PATENT DOCUMENTS

EP 0395489 10/1990
(Continued)

*Primary Examiner* — Tashiana Adams
(74) *Attorney, Agent, or Firm* — Finnegan Henderson Farabow Garrett & Dunner LLP

(57) ABSTRACT

The present invention provides track assemblies and a method that allow bringing the contact patch towards the inside (the outside) of the suspension arm, by providing a asymmetric track assembly, either by lowering at least one inside (outside) support wheel relative to the remaining support wheels, or by using a belt that comprises, transversally, at least one first profile on the outer (inner) side thereof lower than a second profile on an inner side thereof.

34 Claims, 6 Drawing Sheets

U.S. PATENT DOCUMENTS

| | | |
|---|---|---|
| 6,006,847 A | 12/1999 | Knight |
| 6,076,619 A | 6/2000 | Hammer |
| 6,125,956 A | 10/2000 | Gignac |
| 6,199,646 B1 | 3/2001 | Tani et al. |
| RE37,174 E * | 5/2001 | Grawey et al. ............... 180/9.21 |
| 6,234,590 B1 | 5/2001 | Satzler |
| 6,505,896 B1 * | 1/2003 | Boivin et al. ................. 305/178 |
| 6,510,913 B1 * | 1/2003 | Morin et al. .................. 180/182 |
| 6,609,771 B2 * | 8/2003 | Morin et al. .................. 305/178 |
| 6,615,939 B1 | 9/2003 | Karales et al. |
| 6,810,975 B2 | 11/2004 | Nagorcka et al. |
| 6,874,586 B2 * | 4/2005 | Boivin et al. ................. 180/9.26 |
| D505,136 S | 5/2005 | Brazier |
| 6,904,986 B2 | 6/2005 | Brazier |
| D528,133 S | 9/2006 | Brazier |
| 7,131,507 B2 | 11/2006 | Wenger et al. |
| 7,131,508 B2 | 11/2006 | Brazier |
| 7,229,141 B2 * | 6/2007 | Dandurand et al. ........... 305/165 |
| 7,255,184 B2 * | 8/2007 | Loegering et al. ............ 180/9.26 |
| 7,347,512 B2 * | 3/2008 | Dandurand .................... 305/178 |
| 7,533,945 B2 * | 5/2009 | Jee et al. ....................... 305/178 |
| 7,866,767 B2 * | 1/2011 | Lemaire et al. ............... 305/178 |
| 2002/0017403 A1 * | 2/2002 | Phely ............................ 180/9.21 |
| 2004/0017107 A1 | 1/2004 | Phely et al. |
| 2004/0026995 A1 * | 2/2004 | Lemieux ....................... 305/178 |
| 2004/0159475 A1 | 8/2004 | Moor, Jr. |
| 2006/0113121 A1 | 6/2006 | Radke et al. |
| 2006/0181148 A1 | 8/2006 | Bessette |
| 2007/0029871 A1 * | 2/2007 | Wake et al. ................. 301/124.1 |
| 2007/0159004 A1 * | 7/2007 | St-Amant ...................... 305/165 |
| 2009/0218882 A1 * | 9/2009 | Rowbottom et al. .......... 305/158 |

FOREIGN PATENT DOCUMENTS

WO    WO 2006/066406    6/2006

* cited by examiner

TRACK ASSEMBLY FOR AN ALL-TERRAIN VEHICLE

CROSS REFERENCE TO RELATED APPLICATIONS

This application is a continuation, and claims the benefit under 35 U.S.C. 120, of U.S. patent application Ser. No. 12/028,177 filed on Feb. 8, 2008 now abandoned, which claims priority on Canadian application no. 2,606,039, filed on Oct. 3, 2007. All documents identified above are incorporated by reference herein.

FIELD OF THE INVENTION

The present invention relates to ATV. More specifically, the present invention is concerned with a track assembly for an all-terrain vehicle.

BACKGROUND OF THE INVENTION

As well known in the art, a track system may be installed on a wheeled ATV (or other wheeled recreational, industrial or agricultural vehicles), to provide an—at least partly-, temporarily, tracked ATV.

The resulting contact area between an endless belt of the tracked vehicle and the underlying ground surface, referred to as patch, is larger than the contact area, or patch, of a corresponding wheel of the vehicle when wheeled on the underlying ground surface, thereby increasing flotation of the vehicle, over smooth terrains such as snow for example.

A drawback is that, generally, this increased contact patch involves an increased area of friction, which needs to be opposed for steering. As a result, it is increasingly harder to rotate the patch around a pivot steering point and steering effort submitted to such a tracked vehicle is higher than to a corresponding wheeled vehicle, i.e. the ATV on its wheels for example.

Using endless belts having a curved transverse geometry allows reducing this problem by allowing an increased contact surface when needed, while maintaining a reduced contact surface on hard surfaces for example.

However, there is still a need in the art for a track assembly for an all-terrain vehicle.

SUMMARY OF THE INVENTION

More specifically, there is provided a vehicle having a main frame and supported on the ground by at least two track assemblies, each track assembly comprising a longitudinal endless belt tensioned around corner wheels and a sprocket wheel, and support wheels provided on a lower run of the longitudinal endless belt, on each side of a suspension arm of the main frame, wherein each track assembly comprises a laterally asymmetric structure comprising at least one of: i) at least one of the support wheels, on one of: i) an inward side and ii) an outward side of the suspension arm, located at a lower position in relation to remaining support wheels; and ii) the belt laterally comprising regions of different profiles.

There is provided a drive system for a vehicle having a main frame supporting an engine and a body of the vehicle and steering device connected to the main frame, a longitudinal endless belt, disposed on the frame of the drive system and connected to the engine to propel the vehicle, being tensioned around corner wheels and a sprocket wheel, support wheels being provided on a lower run of the longitudinal endless belt, on each side of a suspension arm of the main frame, the drive system comprising a first lateral region and a second lateral region, the lateral regions being defined by at least one of: i) the endless belt laterally comprising regions of different profiles; and ii) at least one of the support wheels, on one of: i) an inward side and ii) an outward side of the suspension arm, being located at a lower position in relation to remaining support wheels.

There is further provided a track assembly for a wheeled vehicle, comprising a longitudinal endless belt tensioned around corner wheels and a sprocket wheel, and support wheels provided on a lower run of the longitudinal endless belt, on each side of a suspension arm of the main frame, wherein each track assembly comprises a laterally asymmetric structure comprising at least one of: i) at least one of the support wheels, on one of: i) an inward side and ii) an outward side of the suspension arm, located at a lower position in relation to remaining support wheels; and ii) the belt laterally comprising regions of different profiles.

Other objects, advantages and features of the present invention will become more apparent upon reading of the following non-restrictive description of embodiments thereof, given by way of example only with reference to the accompanying drawings.

DESCRIPTION OF EMBODIMENTS OF THE INVENTION

Figure 1:
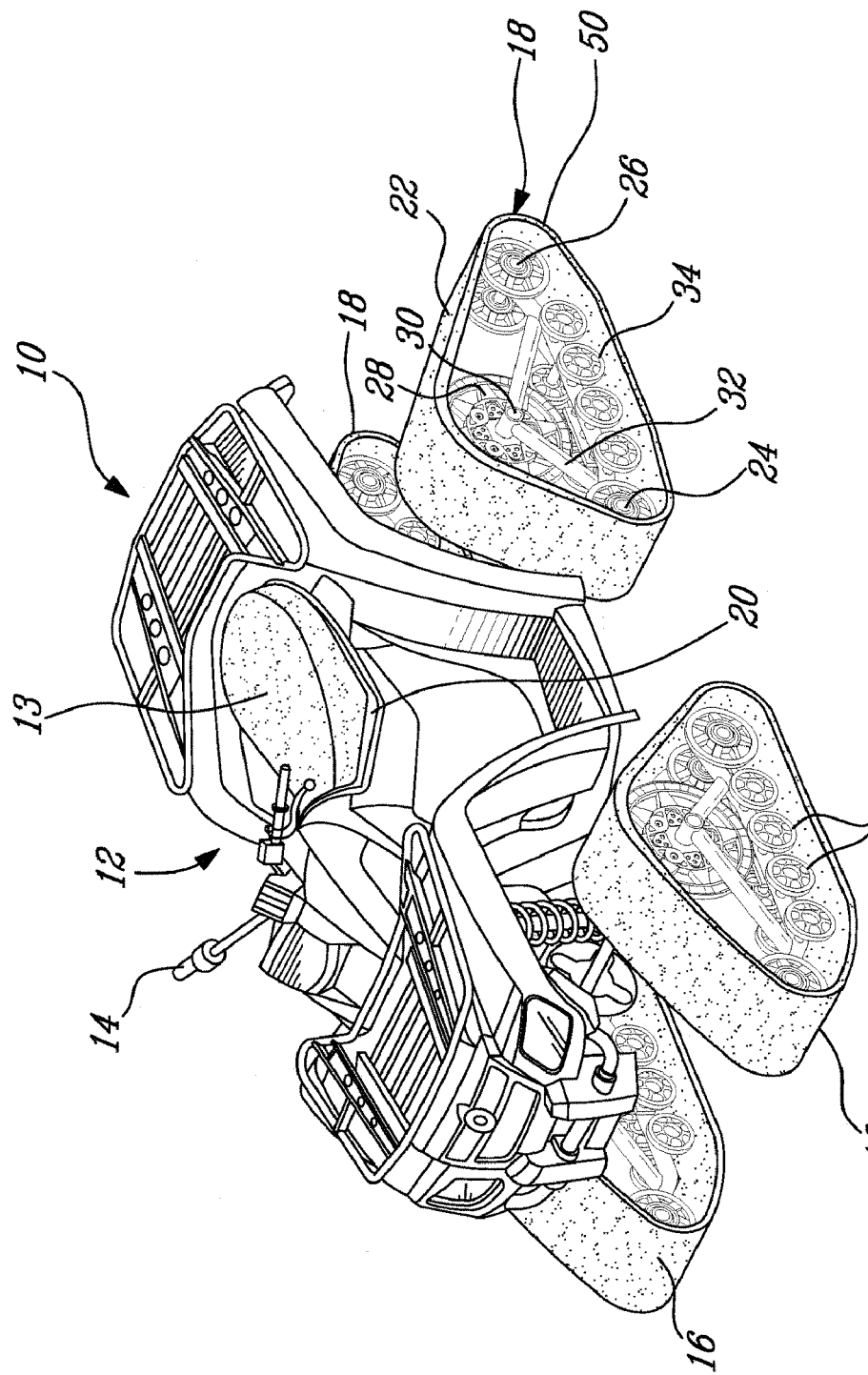
FIG. 1 is a front left-elevation view a vehicle according to an embodiment of an aspect of the present invention.

As illustrated in FIG. 1, a vehicle 10 according to an embodiment of an aspect of the present invention generally comprises a body 12 with a seat 13 for accommodating a rider (nor shown) who uses handlebars 14, for example, to steer the vehicle. The body 12 is supported by track assemblies 16 in the front and track assemblies 18 in the back, in place of front and rear wheels respectively in the case of a wheeled vehicle, symmetrically about a vertical axis 20.

The track assemblies may be operatively connected to the engine (not shown) to propel the vehicle 10.

As best seen in FIG. 1, a track assembly typically comprises a longitudinal endless belt 22 tensioned around corner wheels 24, 26 and a sprocket wheel 28. The track assembly is removably connected to a hub 30 by a frame 32; the hub 30 corresponding to the one previously connecting a wheel of the wheeled vehicle and providing rotational motion to that wheel for example.

Figure 3:
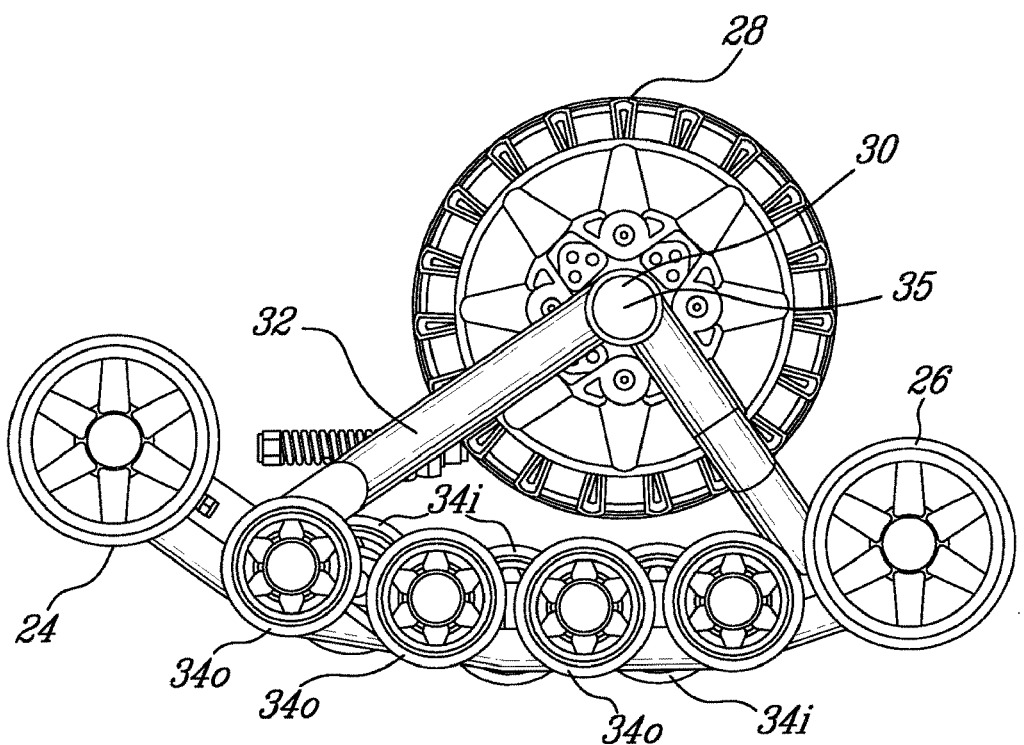
FIG. 3 is a side view of a track assembly according to an embodiment of an aspect of the present invention.

In FIG. 3, the hub 30 transfers its rotational motion to the sprocket wheel 28 that turns the track assembly around the same hub axis 30 and sprocket axis 35 by contact with the endless belt 22. The sprocket 28 and frame 32 are independently rotatable about hub 30.

Figure 2:
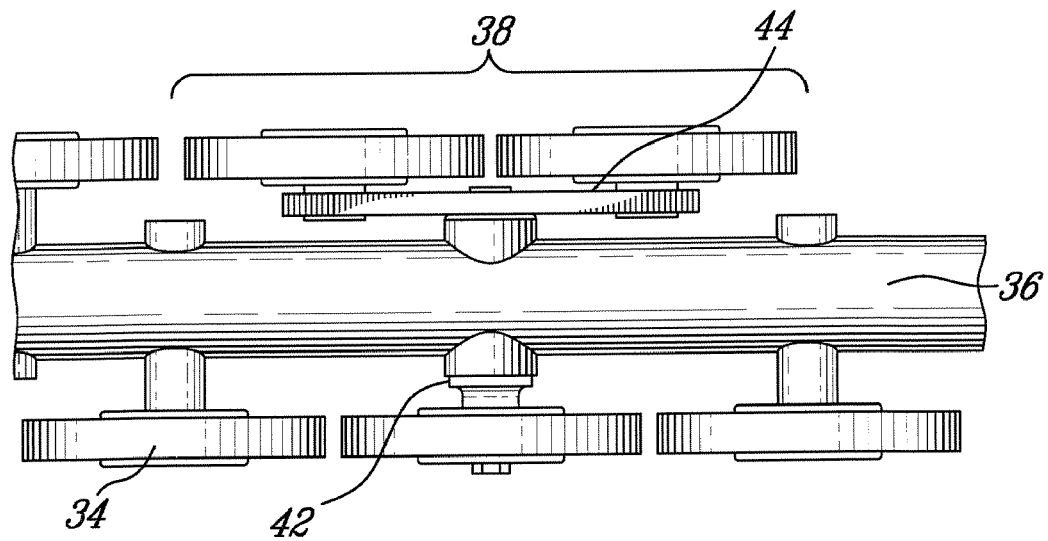
FIG. 2 is a partial top view of a track assembly according to an embodiment of an aspect of the present invention.
Figure 4:
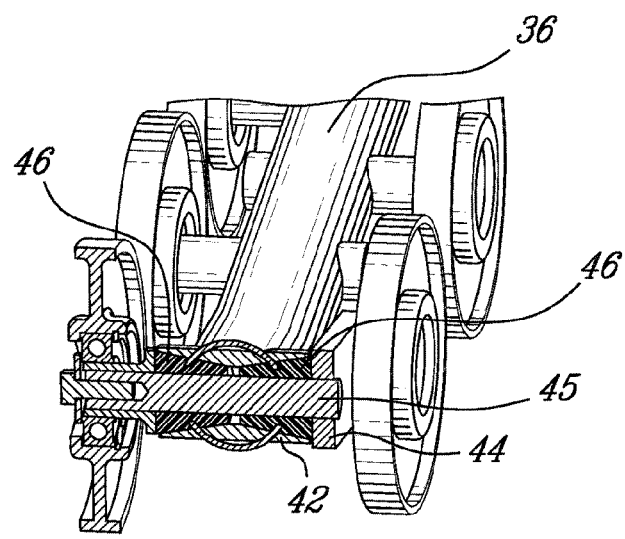
FIG. 4 is a cross section of the track assembly of FIG. 2.

Support wheels 34 are provided, on a lower run of the endless belt 22, on each side of a suspension arm 36 of the main frame 32 best seen in FIGS. 2 and 4 for example.

The endless belt 22 of each track assembly is typically an endless reinforced rubber belt, having a ground engaging surface and an inner surface. The ground-engaging surface may be provided with traction lugs that engage the underlying ground surface, whereas the inner surface is provided with driving lugs that engage the wheels.

Figure 7:
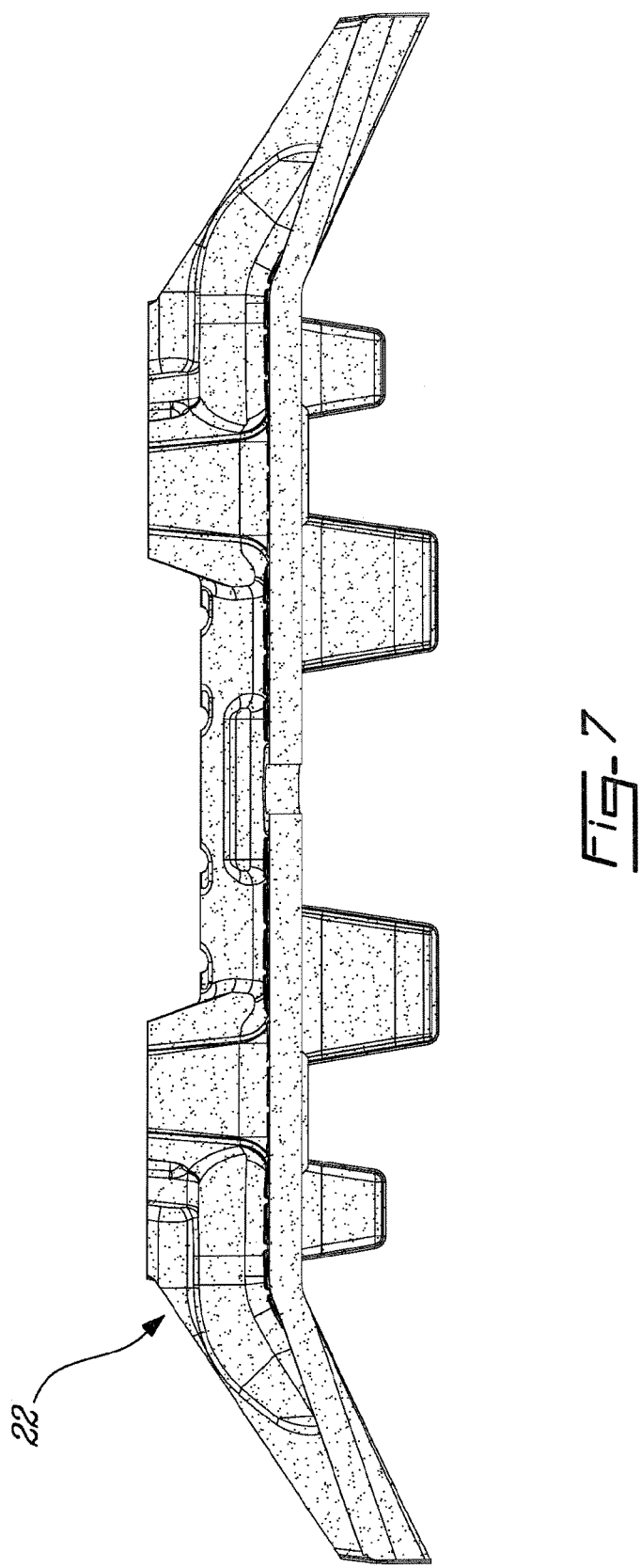
FIG. 7 is a cross section of a belt having a generally convex transverse profile.

The endless belt 22 may have a generally convex transverse profile, from the outward peripheral edge to the inner peripheral edge thereof, to provide a limited contact surface with the underground when the underground is hard, as known in the art (see FIG. 7).

When replacing a tire of a vehicle by a track assembly without modification of the geometry of the vehicle, the contact area, now between the endless belt and the underground surface, is generally shifted outward relative to the contact patch previously between the tire and the underground surface. It is found that by lowering an inner support wheel, the contact patch may be repositioned.

In a first embodiment of the present invention, as illustrated in FIGS. 2 to 4, the contact patch of the track system is shifted laterally in relation to the suspension arm 36, either inwards or outwards, by providing that at least one support wheel 34 be lower that the remaining ones, on the inward side or the outward side of the suspension arm 36 respectively.

Thus, as illustrated in FIG. 3, inside support wheels 34i may be lowered slightly relative to outside support wheels 34o, so as to shift the contact patch laterally inwards, i.e. away from the outward peripheral edge 50 of the width of the belt 22 (see FIG. 1).

Providing at least one support wheel lower than the remaining support wheels, on the inside of the main suspension arm, allows the contact patch provided by this at least one lower support wheel to be positioned at the location it used to be when the vehicle, conceived for tires, was on tires.

As known in the art, support wheels 34 may further be arranged in tandem in order to alleviate the road on the contacts points created, as tandem 38 shown in FIG. 2, which frame 44 is mounted by pivot 42 to the suspension arm 36 of the main frame 32.

The frame 44 of the tandem 38 of these inside support wheels 34i, which are thus in the contact patch, being mounted on the pivot 42 (FIG. 2), is able to adapt and conform to the underground terrain.

In such an arrangement, by providing that at least one lower support wheel is mounted on a secondary frame 44 pivotally connected to the main suspension arm so that the motion of the secondary frame is relatively independent from the rest of the track assembly, the generated contact patch moves as requested by the movement of the vehicle, for instance when the track pivots around a vertical axis for the vehicle being able to turn.

As shown in FIG. 4, the axle 45 of the tandem 38 with lowered support wheels may be provided with rubber bushings 46, for a soft suspension 44 independent from the main suspension 32, by providing a further cushioning versus shocks, and further improved adaptation to the underground terrain.

Figure 5:
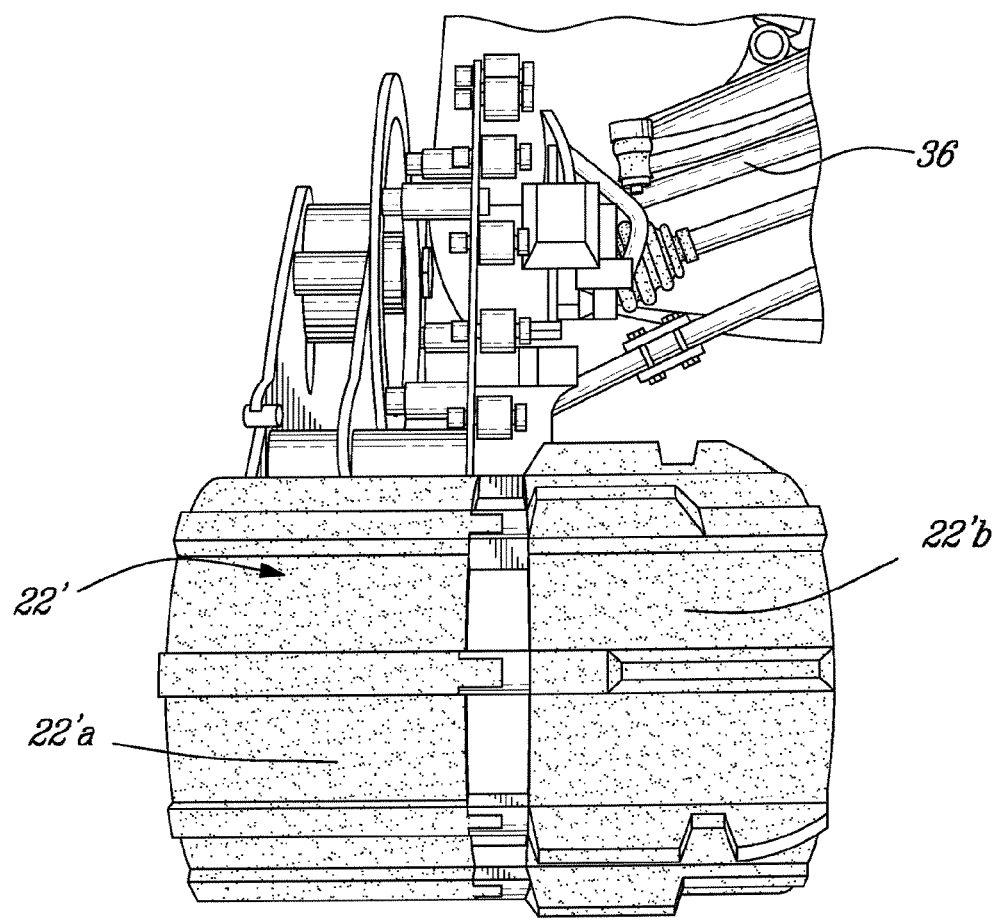
FIG. 5 illustrates a belt of a track assembly according to a further embodiment of the present invention.
Figure 6A:
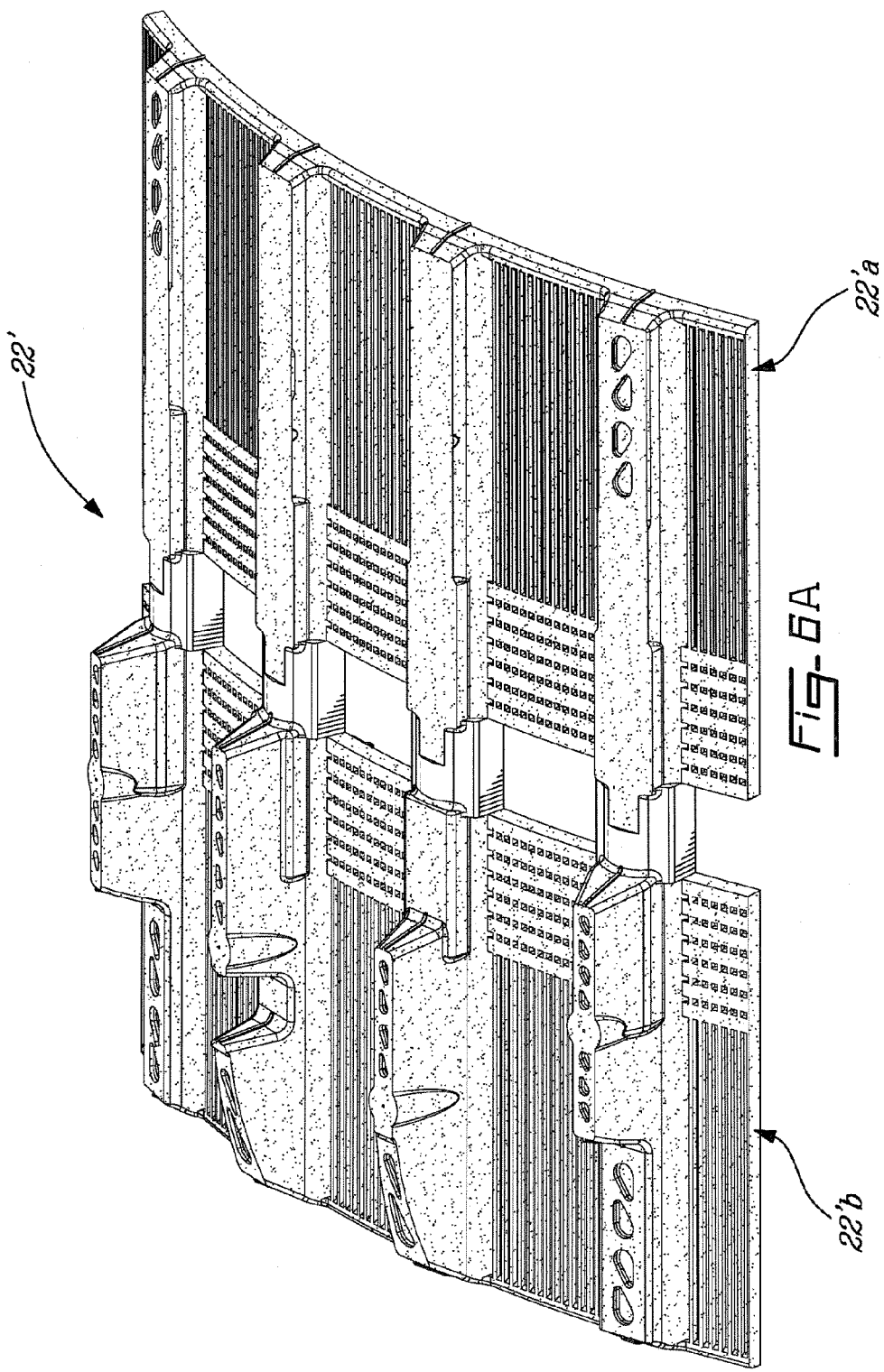
FIG. 6 are upper partial perspective views of: a) an asymmetric belt and b) an asymmetric belt having a generally convex transverse profile, for a track assembly according to a further embodiment of the present invention.
Figure 6B:
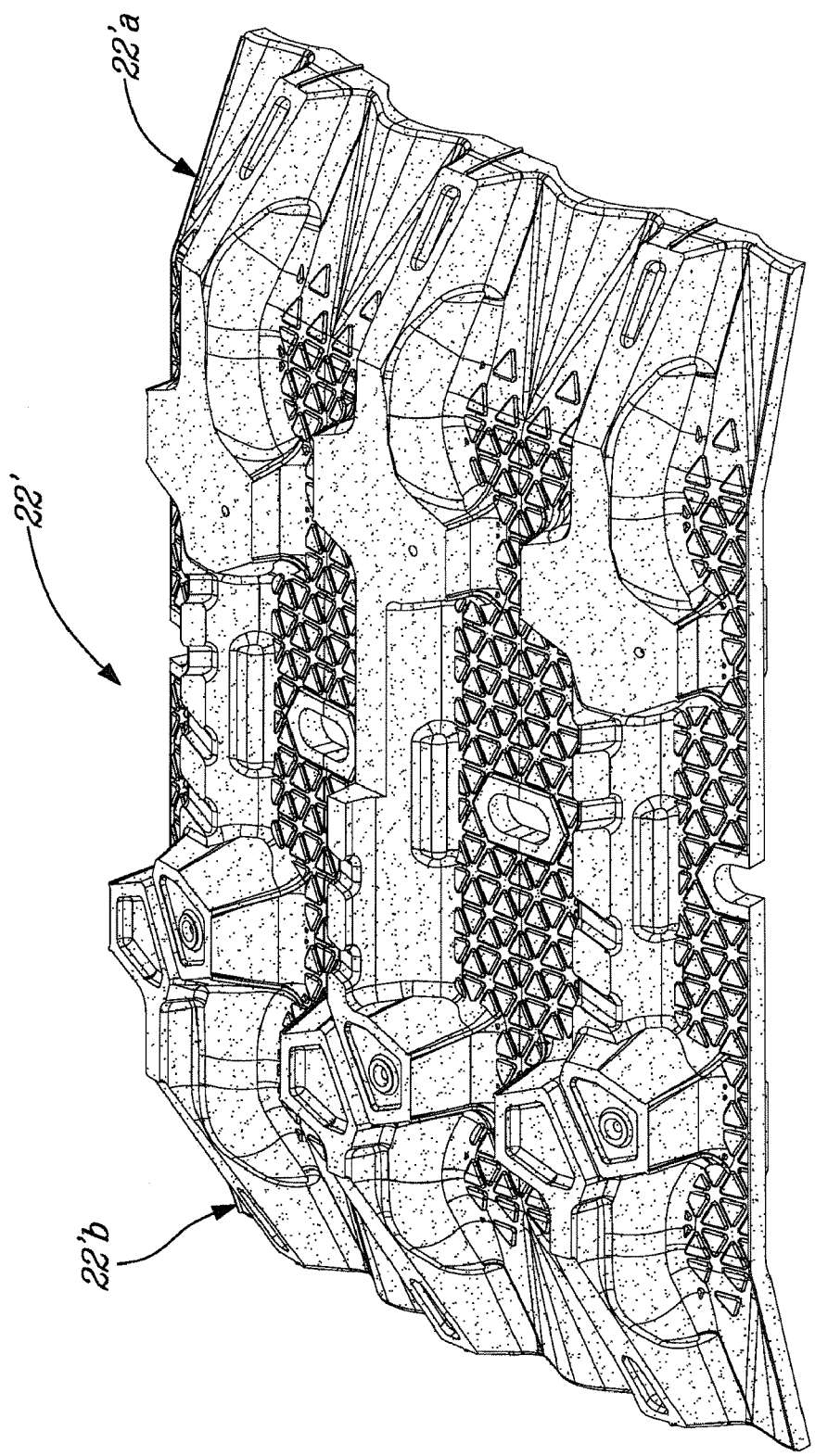

In a second embodiment illustrated for example in FIGS. 5 and 6, the contact patch of the track system is shifted laterally in relation to the suspension arm 36 by providing that the belt 22 comprises, transversally, at least one first profile 22'a on the outer side thereof, and a second profile 22'b on an inner side thereof. By providing that the second profile 22'b on an inner side is higher that the first profile 22'a, the contact patch is thus brought towards the inside of the suspension arm 36.

Therefore, the contact patch of a track system may be shifted laterally in relation to the suspension arm 36, inwards (or outwards), by providing a asymmetric track assembly, either by lowering at least one inside (outside) support wheel relative to the remaining support wheels, or by using a belt that comprises, transversally, at least one first profile on the outer side thereof lower (higher) than a second profile on an inner side thereof.

As people in the art will appreciate, an asymmetric track according to the present invention may combine at least one inside support wheel lowered relative to the remaining support wheels and a varying-profile belt, as described hereinabove.

Therefore, the present invention provides track assemblies and a method that allow bringing the contact patch towards the inside of the suspension arm 36, thereby repositioning the normal tire contact patch, i.e. the contact patch of the vehicle when on wheels. As a result, the steering effort of the track system is reduced to a minimum in a range of conditions, including snow, dirt, asphalt, rocks, etc, for example.

Therefore, according to an aspect of the present invention, there is provided a vehicle comprising at least two asymmetric track assemblies replacing wheels of a wheeled vehicle.

A suspension as described herein may be applied to a range of wheeled vehicles, such as for example recreational vehicles, ATV, light industrial vehicles, industrial vehicles, agricultural vehicles and military vehicles.

The present invention allows reducing the steering effort in such vehicles, which geometry of the suspension is specifically designed for wheels, to a minimum in all conditions, snow, dirt, asphalt, rocks, etc.

Although the present invention has been described hereinabove by way of embodiments thereof, it may be modified, without departing from the nature and teachings of the subject invention as defined in the appended claims.

What is claimed is:

1. An endless track for a track assembly of an all-terrain vehicle (ATV), the ATV being designed to travel on a plurality of ground-engaging wheels, the track assembly being mountable to the ATV in place of a given one of the ground-engaging wheels, the track assembly comprising a drive wheel for imparting motion to the endless track, the track assembly comprising a plurality of support wheels for rolling on a bottom run of the endless track, the endless track comprising:
    an inner side for facing the drive wheel and the support wheels;
    a ground-engaging outer side for engaging the ground on which the ATV travels; and
    a first lateral edge and a second lateral edge defining a width of the endless track; the endless track having a first half, a second half, and a centerline between the first half and the second half, the first half extending from the first lateral edge to the centerline, the second half extending from the second lateral edge to the centerline, the first half being configured to produce more traction on the ground than the second half.

2. An endless track as claimed in claim 1, wherein the plurality of support wheels comprises a first set of support wheels and a second set of support wheels, the inner side being configured to contact the first set of support wheels between the centerline and the first lateral edge and to contact the second set of support wheels between the centerline and the second lateral edge, the endless track being configured to apply more pressure on the ground at a region beneath the first set of support wheels than at a region beneath the second set of support wheels.

3. An endless track as claimed in claim 1, wherein the first lateral edge is located closer to a center of the ATV than the second lateral edge.

4. An endless track as claimed in claim 1, wherein a maximum thickness of the endless track between the centerline and the first lateral edge is greater than a maximum thickness of the endless track between the centerline and the second lateral edge.

5. An endless track as claimed in claim 1, wherein the ground-engaging outer side comprises a first set of traction profiles between the centerline and the first lateral edge and a second set of traction profiles between the centerline and the second lateral edge, at least one traction profile in the first set of traction profiles having a greater height than each traction profile in the second set of traction profiles.

6. An endless track as claimed in claim 1, wherein the endless track is asymmetric relative to the centerline to apply more pressure on the ground between the centerline and the first lateral edge than between the centerline and the second lateral edge.

7. An endless track as claimed in claim 1, wherein the endless track has a generally convex shape between the first lateral edge and the second lateral edge.

8. An assembly for an all-terrain vehicle (ATV), the ATV being designed to travel on a plurality of ground-engaging wheels, the assembly being mountable to the ATV in place of a given one of the ground-engaging wheels, the assembly comprising:
 a. a frame;
 b. a drive wheel for driving an endless track, the endless track comprising:
  i. an inner side;
  ii. a ground-engaging outer side for engaging the ground on which the ATV travels; and
  iii. a first lateral edge and a second lateral edge defining a width of the endless track,
 the endless track having a first half, a second half, and a centerline between the first half and the second half, the first half extending from the first lateral edge to the centerline, the second half extending from the second lateral edge to the centerline;
 and
 c. a plurality of support wheels for contacting a bottom run of the endless track, the support wheels being arranged to cause the first half of the endless track to produce more traction on the ground than the second half of the endless track.

9. An assembly as claimed in claim 8, wherein the plurality of support wheels comprises a first set of support wheels and a second set of support wheels, the first set of support wheels being mounted to contact the inner side of the endless track between the centerline and the first lateral edge, the second set of support wheels being mounted to contact the inner side of the endless track between the centerline and the second lateral edge.

10. An assembly as claimed in claim 9, wherein the first set of support wheels and the second set of support wheels are arranged to cause the endless track to apply more pressure on the ground at a region beneath the first set of support wheels than at a region beneath the second set of support wheels.

11. An assembly as claimed in claim 9, wherein a lowest point of the first set of support wheels is lower than a lowest point of the second set of support wheels.

12. An assembly as claimed in claim 9, wherein an imaginary line passing through a lowest point of each support wheel of the first set of support wheels extends lower than an imaginary line passing through a lowest point of each support wheel of the second set of support wheels.

13. An assembly as claimed in claim 9, wherein the first set of support wheels is arranged to contact the bottom run of the endless track at a first contact area and the second set of support wheels is arranged to contact the bottom run of the endless track at a second contact area, the first contact area reaching lower than the second contact area.

14. An assembly as claimed in claim 9, wherein the frame comprises a suspension arm, the first set of support wheels and the second set of support wheels being mounted to the suspension arm and being respectively located on opposite sides of the suspension arm.

15. An assembly as claimed in claim 14, wherein first and second ones of the support wheels are mounted to a tandem member that is pivotable relative to the suspension arm about a pivot point.

16. An assembly as claimed in claim 15, comprising a resilient suspension between the suspension arm and the tandem member.

17. A track assembly for an all-terrain vehicle (ATV), the ATV being designed to travel on a plurality of ground-engaging wheels, the track assembly being mountable to the ATV in place of a given one of the ground-engaging wheels, the track assembly comprising:
 a. a frame;
 b. a drive wheel;
 c. a plurality of support wheels; and
 d. an endless track comprising:
  i. an inner side facing the drive wheel and the support wheels, the drive wheel being rotatable to impart movement of the endless track, the support wheels contacting a bottom run of the endless track;
  ii. a ground-engaging outer side for engaging the ground on which the ATV travels; and
  iii. a first lateral edge and a second lateral edge defining a width of the endless track,
 the endless track having a first half, a second half, and a centerline between the first half and the second half, the first half extending from the first lateral edge to the centerline, the second half extending from the second lateral edge to the centerline, the track assembly being configured to cause the first half of the endless track to produce more traction on the ground than the second half of the endless track.

18. An assembly for an all-terrain vehicle (ATV), the ATV being designed to travel on a plurality of ground-engaging wheels, the assembly being mountable to the ATV in place of a given one of the ground-engaging wheels, the assembly comprising:
 a. a frame comprising a suspension structure;
 b. a drive wheel for driving an endless track, the endless track comprising:
  i. an inner side;
  ii. a ground-engaging outer side for engaging the ground on which the ATV travels; and
  iii. a first lateral edge and a second lateral edge defining a width of the endless track; and
 c. a plurality of support wheels for contacting a bottom run of the endless track, the plurality of support wheels comprising:
  i. a first set of support wheels mounted to contact the bottom run of the endless track between the suspension structure and the first lateral edge of the endless track; and ii. a second set of support wheels mounted to contact the bottom run of the endless track between the suspension structure and the second lateral edge of the endless track, wherein, when the assembly is on a horizontal ground surface, a lowest point of a support wheel mounted to contact the bottom run of the endless track between the suspension structure and the first lateral edge of the endless track is lower than a lowest point of every support wheel mounted to contact the bottom run of the endless track between the suspension structure and the second lateral edge of the endless track.

19. A track assembly for an all-terrain vehicle (ATV), the ATV being designed to travel on a plurality of ground-engaging wheels, the track assembly being mountable to the ATV in place of a given one of the ground-engaging wheels, the track assembly comprising:
   a. a frame;
   b. a drive wheel;
   c. a plurality of support wheels; and
   d. an endless track comprising:
      i. an inner side facing the drive wheel and the support wheels, the drive wheel being rotatable to impart movement of the endless track, the support wheels contacting a bottom run of the endless track;
      ii. a ground-engaging outer side for engaging the ground on which the ATV travels; and
      iii. a first lateral edge and a second lateral edge defining a width of the endless track;
the track assembly being configured such that, when the ATV is steered to turn, the endless track pivots on the ground about an axis that is located closer to the first lateral edge than to the second lateral edge.

20. A track assembly as claimed in claim 19, wherein the plurality of support wheels comprises a first set of support wheels and a second set of support wheels, the first set of support wheels contacting the inner side of the endless track closer to the first lateral edge than to the second lateral edge, the second set of support wheels contacting the inner side of the endless track closer to the second lateral edge than to the first lateral edge, the endless track being configured to apply more pressure on the ground at a region beneath the first set of support wheels than at a region beneath the second set of support wheels.

21. A track assembly as claimed in claim 19, wherein, in use, the first lateral edge is located closer to a center of the ATV than the second lateral edge.

22. A track assembly as claimed in claim 19, wherein the endless track has a maximum thickness closer to the first lateral edge than to the second lateral edge.

23. A track assembly as claimed in claim 19, wherein the endless track has a first half, a second half, and a centerline between the first half and the second half, the first half extending from the centerline to the first lateral edge, the second half extending from the centerline to the second lateral edge, the ground-engaging outer side comprising a first set of traction profiles between the centerline and the first lateral edge and a second set of traction profiles between the centerline and the second lateral edge, at least one traction profile in the first set of traction profiles having a greater height than each traction profile in the second set of traction profiles.

24. A track assembly as claimed in claim 19, wherein the endless track has a first half, a second half, and a centerline between the first half and the second half, the first half extending from the centerline to the first lateral edge, the second half extending from the centerline to the second lateral edge, the endless track being asymmetric relative to the centerline to apply more pressure on the ground between the centerline and the first lateral edge than between the centerline and the second lateral edge.

25. A track assembly as claimed in claim 19, wherein the plurality of support wheels comprises a first set of support wheels and a second set of support wheels, the first set of support wheels being mounted to contact the inner side of the endless track closer to the first lateral edge than to the second lateral edge, the second set of support wheels being mounted to contact the inner side of the endless track closer to the second lateral edge than to the first lateral edge, the first set of support wheels and the second set of support wheels being arranged to cause the endless track to apply more pressure on the ground at a region beneath the first set of support wheels than at a region beneath the second set of support wheels.

26. A track assembly as claimed in claim 25, wherein a lowest point of the first set of support wheels is lower than a lowest point of the second set of support wheels.

27. A track assembly for an all-terrain vehicle (ATV), the ATV being designed to travel on a plurality of ground-engaging wheels, the track assembly being mountable to the ATV in place of a given one of the ground-engaging wheels, the track assembly comprising:
   a. a frame;
   b. a drive wheel;
   c. a plurality of support wheels; and
   d. an endless track comprising:
      i. an inner side facing the drive wheel and the support wheels, the drive wheel being rotatable to impart movement of the endless track, the support wheels contacting a bottom run of the endless track; and
      ii. a ground-engaging outer side for engaging the ground on which the ATV travels;
wherein, when the ATV travels on the ground, the endless track applies more pressure on the ground where a contact patch of the given one of the ground-engaging wheels would be located than where the contact patch of the given one of the ground-engaging wheels would not be located.

28. A track assembly for providing traction to an all-terrain vehicle (ATV), the ATV being designed to travel on a plurality of ground-engaging wheels, the track assembly being mountable to the ATV in place of a given one of the ground-engaging wheels, the track assembly comprising:
   a) a frame;
   b) a plurality of wheels; and
   c) an endless track disposed around the plurality of wheels to engage the ground, the endless track comprising:
      an inner surface facing the plurality of wheels;
      a ground-engaging outer surface for engaging the ground; and
      a first lateral edge and a second lateral edge defining a width of the endless track;
   wherein the plurality of wheels includes:
      i. a drive wheel for imparting motion to the endless track;
      ii. a first corner wheel and a second corner wheel spaced apart in a longitudinal direction of the track assembly; and
      iii. a plurality of support wheels on a bottom run of the endless track, the support wheels being located between the first corner wheel and the second corner wheel in the longitudinal direction of the track assembly, the support wheels being configured such that, when the track assembly is on a horizontal ground surface, a support wheel between the frame and the first lateral edge of the endless track extends lower than every support wheel between the frame and the second lateral edge of the endless track.

29. A track assembly as claimed in claim 28, wherein the support wheel between the frame and the first lateral edge of the endless track is a first support wheel between the frame and the first lateral edge of the endless track, the support wheels being configured such that, when the track assembly is on the horizontal ground surface, a second support wheel between the frame and the first lateral edge of the endless track extends lower than every support wheel between the frame and the second lateral edge of the endless track.

30. A track assembly as claimed in claim 28, wherein the support wheel between the frame and the first lateral edge of the endless track is mounted to the frame in a lower position than every support wheel between the frame and the second lateral edge of the endless track.

31. A track assembly as claimed in claim 29, wherein the first support wheel between the frame and the first lateral edge of the endless track and the second support wheel between the frame and the first lateral edge of the endless track are mounted in tandem to a structure pivotable relative to the frame.

32. A track assembly as claimed in claim 28, comprising a rubber bushing disposed between (i) the frame and (ii) the support wheel between the frame and the first lateral edge of the endless track to cushion against shocks.

33. A track assembly as claimed in claim 31, comprising a rubber bushing disposed between the frame and the structure pivotable relative to the frame to cushion against shocks.

34. A track assembly as claimed in claim 28, wherein, when the track assembly is on the horizontal ground surface, the endless track applies more pressure on the horizontal ground surface between the frame and the first lateral edge of the endless track than between the frame and the second lateral edge of the endless track.

* * * * *